United States Patent [19]

Harada et al.

[11] 4,407,769

[45] Oct. 4, 1983

[54] METHOD OF MANUFACTURING CEMENT PRODUCTS HAVING SUPERIOR MECHANICAL STRENGTH

[75] Inventors: Shozo Harada, Tokoname; Kazuo Ito, Tokai; Takayuki Shirai, Tokoname; Tetsuya Koide, Nagoya, all of Japan

[73] Assignee: Ina Seito Co., Ltd., Tokoname, Japan

[21] Appl. No.: 253,747

[22] PCT Filed: Apr. 2, 1980

[86] PCT No.: PCT/JP80/00058

§ 371 Date: Mar. 9, 1981

§ 102(e) Date: Mar. 9, 1981

[51] Int. Cl.³ .............................................. C04B 7/02
[52] U.S. Cl. ....................................... 264/60; 264/62; 264/65; 264/82; 264/333
[58] Field of Search ..................... 264/60, 62, 82, 333, 264/65

[56] References Cited

U.S. PATENT DOCUMENTS 2,562,477 9/1951 Ramsay ................................. 264/62
2,579,050 12/1951 Ramsay ................................. 264/62

Primary Examiner—John A. Parrish
Attorney, Agent, or Firm—Wenderoth, Lind & Ponack

[57] ABSTRACT

This invention is based on the discovery by the inventors that, if a preliminary hydration hardening process and a full-scale hydration hardening process are provided after the molding process, and a process for burning a hardened body of cement at a high temperature is provided between the preliminary and full-scale hardening processes, it is possible to obtain a molded product of cement having a higher mechanical strength than any such product according to any known method including no such burning process.

According to this invention, there is provided a method of manufacturing a product of cement having high mechanical strength, which method comprises the steps in sequence of adding water, and if required, glass fibers or other reinforcing material, into a mixture of cement and an aggregate, and kneading the whole completely; molding the kneaded mixture into a desired shape; hardening the molded body preliminarily by hydration; burning the preliminarily hardened body at a high temperature; and hardening the burned body on a full scale by hydration.

6 Claims, No Drawings ns the manufacture of a molded clay product in order to impart a beautiful tone of color and luster to its surface has hitherto been considered inapplicable to a molded product of cement, because the high temperature required for the smoking treatment reduces the strength of the cement product. The same reason has inevitably imposed various restrictions on the glazing of a molded product of cement. It has been imperative to use the glaze which completely melts at a temperature under 450° C., in order to avoid any reduction in the mechanical strength of a hardened body of cement when it is heated for the fusion of the glaze. In order to cope with the situation, there has been developed a phosphoric frit glaze having a low melting point as disclosed in, for example, Japanese Patent Publication No. 10530/1974. This special glaze is, however, not only inferior in weather and chemical resistance to an ordinary glaze having a high melting point, but is also
METHOD OF MANUFACTURING CEMENT PRODUCTS HAVING SUPERIOR MECHANICAL STRENGTH

TECHNICAL FIELD

This invention relates to an improvement in the method in which a kneaded mixture of cement obtained by kneading cement, an aggregate and water is molded into a desired shape, and the resulting molded product is hardened by hydration of cement particles in water or air. More particularly, this invention is concerned with a method of manufacturing cement products, in which the hydration hardening process succeeding to the molding process is divided into a preliminary process for hardening by hydration and a full-scale process for hardening by hydration, and an intermediate product obtained from the preliminary hardening process is burned at a high temperature in a process provided between the preliminary and full-scale hardening processes, whereby there can be obtained a molded cement product having a higher mechanical strength than any such product known in the art.

BACKGROUND ART

A hardened body of cement always undergoes a sharp reduction in mechanical strength when heated at a high temperature of, say, 450° C. or above. It is, for example, known that, if a hardened body of Portland cement is heated at 450° C., the calcium hydroxide formed by hydration of calcium silicate is decomposed into calcium oxide and water, resulting in the occurrence of heavy shrinkage in the body of cement, which sharply reduces its mechanical strength, particularly compressive strength (Yu Harada & Toru Sakai: "Heat Resistant Concrete," Industry & Products, 50, page 119, right column). It is also known that a hardened body of aluminous cement has its mechanical strength reduced sharply when heated at a high temperature, though for different chemical reasons from those hereinabove described with respect to Portland cement [Akira Wakabayashi: "Properties of a Hardened Body of Aluminous Cement at a High Temperature," Journal of the Society of the Ceramic Industry, 69, 2 (1961), page 28]. Accordingly, nobody has hitherto thought of burning a hardened body of cement at a high temperature in order to obtain a molded product of cement having improved strength.

Under the circumstances, the smoking treatment, which is often utilized in the manufacture of a molded clay product in order to impart a beautiful tone of color and luster to its surface has hitherto been considered inapplicable to a molded product of cement, because the high temperature required for the smoking treatment reduces the strength of the cement product. The same reason has inevitably imposed various restrictions on the glazing of a molded product of cement. It has been imperative to use the glaze which completely melts at a temperature under 450° C., in order to avoid any reduction in the mechanical strength of a hardened body of cement when it is heated for the fusion of the glaze. In order to cope with the situation, there has been developed a phosphoric frit glaze having a low melting point as disclosed in, for example, Japanese Patent Publication No. 10530/1974. This special glaze is, however, not only inferior in weather and chemical resistance to an ordinary glaze having a high melting point, but is also very expensive, and is incapable of imparting a very beautiful surface finish to a product of cement.

It is an object of this invention to provide a method of manufacturing a molded product of cement having a higher mechanical strength than any such product known in the art, by incorporating between a preliminary hydration hardening process and a full-scale hydration hardening process a process for burning a hardened body of cement at a high temperature.

It is another object of this invention to provide a method of manufacturing a product of cement having a surface on which a beautiful and lustrous film of carbon is formed by smoking treatment.

It is a further object of this invention to provide a method of manufacturing a product of cement having a beautifully glazed surface formed by a glaze having a high melting point.

Other objects of this invention will become apparent from the following description.

DISCLOSURE OF THE INVENTION

This invention is based on the discovery by the inventors of this invention of the fact that a hardened body of cement obtained by a preliminary hydration process is decreased in mechanical strength when the body is burned at a certain high temperature, but the strength is then enhanced by a subsequent full-scale hydration process. In other words, the inventors have discovered after their research that, if a preliminary hydration hardening process and a full-scale hydration hardening process are provided after the molding process, and a high-temperature burning process is provided between the preliminary and full-scale hardening processes, it is possible to obtain a molded product of cement having a higher mechanical strength than any such product obtained by the known method in which a hardened body of cement is not burned at a high temperature.

This invention, thus, provides a method of manufacturing a product of cement, which comprises the steps in sequence of adding water, and if required, glass fibers or other reinforcing material, into a mixture of cement and an aggregate, and kneading them carefully; molding the resulting kneaded mixture into a desired shape; hardening the resulting molded product preliminarily by hydration; burning the resulting preliminarily hardened product at a high temperature; and hardening the burned product on a full scale by hydration.

According to another aspect of this invention, it is possible to burn a smoking agent in a reducing atmosphere when a preliminarily hardened body of cement is burned, whereby fine particles of carbon are formed by the thermal decomposition of a hydrocarbon in the smoking agent, and deposited on the surface of the body of cement to form a beautiful and lustrous film of carbon thereon.

According to still another aspect of this invention, it is possible to obtain a product of cement having a beautifully and lustrously glazed surface if a glaze having a high melting point is applied to the surface of a preliminarily hardened body of cement and fused thereto when the body of cement is burned at a high temperature.

The aforesaid smoked or glazed body of cement increases its mechanical strength during the final full-scale hydration hardening process to a greater extent than simply makes up for any reduction of strength caused when it is burned at a high temperature. It is only after the full-scale hydration hardening process that there can be obtained a smoked or glazed product of cement according to the method of this invention.

Although no full clarification has yet been made for the mechanism by which the product of cement according to this invention acquires an increased mechanical strength, the following is a description of the assumption developed by the inventors of this invention. It is well known that the hardening of cement by hydration accomplishes itself over a very long period of time. There is, for example, a report teaching that coarse clinker having a particle size of at least 40μ retains its original state in its interior until after 30 or more years. Anderegg and Hubbel report that clinker particles having a particle size of 15 to 30μ showed a hydration depth of only 1.5μ after seven days of hydration, 3.5μ after 28 days, and only 5.0μ after as long as 90 days (Anderegg and Hubbel: Proc. A.S.T.M., 1929, II; and Concrete, 1930). In view of these facts, it is assumed that the hydration of cement particles proceeds to the extent of about 50% in a period of 30 to 100 days, and shows a very slow increase thereafter over a long period of time in the order of several years, while at least 30% of the interior portion of the cement still remains unhydrated.

According to the method of this invention, however, cement particles obtain a hardened surface layer having a hydration depth of several microns during the preliminary hydration hardening process, but the hardened surface layer is broken during the high-temperature burning process to form cracks defining passages for water from outside the particles to the interior unhydrated portions thereof. It is, therefore, assumed that it is possible to achieve a greater depth of hydration into the particles during the final full-scale hydration hardening process than would be obtained if the preliminary hydration hardening process were simply continued without the intermediary of any burning process, whereby a thicker hardened layer can be obtained in a relatively short time.

The inventors of this invention have been trying to verify their assumption, and recognized the fact that if the duration of the preliminary hydration hardening process is varied while all the other conditions remain unchanged, the final product obtains a greater mechanical strength with an increase in the duration of the preliminary hydration hardening process. This fact is believed to support the propriety of the aforesaid assumption.

BEST MODE OF CARRYING OUT THE INVENTION

The invention will now be described with reference to examples.

EXAMPLE 1

A mixture containing 100 parts of cement, 200 parts of porcelain chamotte having a particle size of 8 mesh or under and 50 parts of water was kneaded for five minutes. The resulting kneaded mixture containing cement was compressed with dehydration of a 500-ton hydraulic press at a pressure of at least 50 kgf/cm$^2$ maintained for at least three minutes, whereby there was obtained a molded product of cement having a water-solid ratio of 0.10. After the molded product was cured in wet air for a week for preliminary hardening by hydration, it was burned for an hour at a sample surface temperature of 800° C. in a roller hearth kiln. It was, then, left to cool in a room having a temperature of 20° C., and immediately after it was cooled, it was immersed in water. After 24 hours, it was cured in an autoclave for eight hours at 180° C. and 10 atm., whereby a cement product was obtained. The cement product thus obtained showed a bending strength of 130 kgf/cm$^2$ when tested on a small material testing machine FSP-500 made by Tokyo Koki K.K., Japan.

EXAMPLE 2

A molded product of cement prepared by repeating the procedures of Example 1 was cured in water for four weeks for preliminary hardening by hydration. After the preliminarily hardened product was dried at 100° C. for eight hours, it is burned in a roller hearth kiln for half an hour at a sample surface temperature of 800° C. Then, it was immersed in water and cured for 28 days, whereby a cement product was obtained. This product showed a bending strength of 160 kgf/cm$^2$.

EXAMPLE 3

A mixture containing 100 parts of cement, 200 parts of porcelain chamotte having a particle size of 8 mesh or under and 60 parts of water was kneaded for five minutes, and the resulting kneaded mixture was molded in a mold measuring 40 mm square by 160 mm long. The molded product was cured in air for seven days for preliminary hardening by hydration. The preliminarily hardened product was heated to 850° C. over a period of two hours, and maintained at that temperature for 15 minutes, followed by cooling to 20° C. over a period of 10 hours. After it was cooled to 20° C., it was immediately immersed in water and cured therein for 28 days, whereby a cement product was obtained. This cement product showed a bending strength of 84.4 kgf/cm$^2$.

EXAMPLE 4

A mixture containing 100 parts of cement, 200 parts of river sand having a particle size not greater than 5 mm and 60 parts of water was kneaded for five minutes. The kneaded mixture was molded into a slate by a thick slate molding machine made by Uchida Kikai Seisakusho K.K., Japan. After the molded product was cured in air for seven days for preliminary hardening by hydration, it was heated to 850° C. over a period of two hours in a slate firing kiln. After the kiln was charged with coal containing a large quantity of volatile matter, it was closed completely for burning the slate at 850° C. for an hour while smoking it simultaneously. After the slate was cooled to 20° C. in the closed kiln over a period of 48 hours, it was discharged from the kiln and immersed in water for curing for 28 days, whereby there was obtained a smoked slate of cement having a somber silver surface. This slate had a bending strength of 106 kgf/cm$^2$.

EXAMPLE 5

A mixture containing 100 parts of cement, 300 parts of a kind of pumice called koka stone and having a particle size of 8 mesh or under, 50 parts of water, 20 parts of reinforcing steel fibers and 2 parts of a water reducing agent was kneaded for 10 minutes. The kneaded mixture was compressed with dehydration by a 500-ton hydraulic press at a pressure of at least 50 kgf/cm$^2$ maintained for at least three minutes, whereby there was obtained a molded product of cement having a water-solid ratio of 0.09. The molded product was cured in water for seven days for preliminary hardening by hydration, and dried at 100° C. for four hours, whereby a preliminarily hardened body of cement was obtained. A glaze having a high melting point, which had been prepared by grinding a mixture containing 10 parts of frit, 80 parts of glass powder, 5 parts of Gairome clay and 5 parts of feldspar in a wet mill for 20 hours, was applied to the surface of the preliminarily hardened body of cement by a spray gun in the quantity of 500 g by dry weight per square meter. The body of cement was, then, burned at 850° C. for an hour in a roller hearth kiln, and after it was cooled to 20° C., it was immersed in water. After 24 hours of immersion, the glazed body was cured with steam at a temperature of 40° C. and a humidity of 100% for 12 hours, whereby a glazed product of cement was obtained. This product had a bending strength of 250 kgf/cm$^2$. When the product was kept in contact with a solution containing 33% by volume of HCl and a solution containing 40% by weight of NaOH each for 72 hours, the glazed surface did not show any change in either case. The glazed product was also tested for weather resistance by a weatherometer. Its glazed surface did not show any change until after 800 hours.

As is obvious from the examples hereinabove described, the term "kneaded mixgture of cement" as herein used does not only refer to a mixture obtained by kneading predetermined quantities of cement, an aggregate and water, but also covers any kneaded mixture further containing various additives ordinarily used in the preparation of the raw material for cement products, such as a workability improver, a sedimentation reducing agent, a setting time adjusting agent, a filler and a coloring agent. Various methods contemplated for shortening the time actually required for kneading the raw material, and the time for which the kneaded mixture is left before molding are very desirable for the purpose of reducing any hardening taking place before the molding operation to thereby prevent any difficulty encountered in the molding operation due to shortage of water in the kneaded material. If 0.5 to 12.0% by weight of heat and alkali resistant reinforcing material, such as glass fibers, ceramic fibers, metal fibers and metal wire, is added into a kneaded mixture of cement based on the weight of cement and an aggregate, it is possible to improve drastically the mechanical strength of the final product, particularly its impact strength, and it is, therefore, possible to obtain a strong glazed thin plate of cement of which the manufacture has hitherto been considered impossible.

The "cement," which is one of the starting materials used in the method of this invention, does not only mean Portland and aluminous cements, but also covers flyash cement, blast furnace cement, slam lime cement and any other mixed cement. In other words, the term must be understood as referring to any and all substance that is hardened by hydration. The "aggregate," which is another starting material, must be one which does not undergo any great change in volume with temperature variation, so that it may not cause any heavy expansion or contraction during the thigh-temperature burning process. Suitable examples of the aggregate include heavyweight aggregates such as barite, ordinary aggregates such as sand, gravel, crushed stone, slag, earthenware chamotte and porcelain chamotte, and lightweight aggregates such as artificial lightweight aggregates. It is particularly preferable to use earthenware or porcelain chamotte for the purpose of obtaining an improved mechanical strength effectively according to this invention.

According to this invention, the molding operation may be accomplished by any known method such as cast molding, pressure dehydration molding, centrifugal dehydration molding and straining dehydration molding. It is particularly effective to employ dehydration molding, rather than cast molding. More specifically, it is effective to cast a kneaded mixture of cement in the form of a liquid, slurry or plastic mass into a mold or strain it directly without casting, and apply a positive pressure thereto through a device for blowing compressed air, a centrifugal separator, or the like. Alternatively, it is effective to cast a kneaded mixture of cement into a mold capable of both water absorption and ventilation and evacuate the mold to thereby apply a negative pressure to its contents. Thus, it is, of course, possible to obtain a molded mass of cement having a water-solid ratio which is comparable to what has heretofore been obtained.

As is obvious from the foregoing description, this invention is characterized most distinctly by a combination of the preliminary hydration hardening process, the high-temperature burning process and the full-scale hydration hardening process. It is possible to employ without any limitation any method for curing cement, whether during the preliminary or full-scale hydration hardening process, if it is possible to supply a sufficient quantity of water as required for the purpose. Therefore, it is possible to employ any known curing method, such as air curing, wet air curing, water curing, steam curing, sprinkle curing and autoclave curing.

The conditions of the burning process, such as temperature and time, basically depend on the type of the aggregate employed, the mixing ratio of the cement and the aggregate, the type of the glaze used, or the like, but it is usually appropriate to maintain a temperature of 650° C. to 950° C. for a period of 5 to 180 minutes. This temperature appears to have a significant bearing on the mechanical strength of the cement product according to this invention. The inventors of this invention have conducted a series of experiments under the following conditions, and obtained the results as shown in Table 1 below:

Conditions of the Experiments:
(1) Aggregate used: Porcelain chamotte having a particle size of 8 mesh or under;
(2) Ratio of cement to the aggregate: 1:2;
(3) Molding method used: Pressure dehydration molding at 75 kgf/cm$^2$;
(4) Preliminary hydration hardening: Curing in wet air for a week;
(5) Full-scale hydration hardening: Curing in water for four weeks; and
(6) Burning: By maintaining each selected temperature for 10 minutes.

TABLE 1

| Burning temp. (°C.) | No burning | 600 | 700 | 800 | 900 | 1,000 | 1,100 |
|---|---|---|---|---|---|---|---|
| Measured bending strength (kgf/cm$^2$) | 100 | 110 | 118 | 129 | 121 | 88 | 60 |

It will be noted from Table 1 that the bending strength of the final product increased with an increase in the burning temperature until 800° C., but started to decrease at 900° C. The results shown in Table 1 indicate that it is most effective to conduct the burning operation at a temperature in the vicinity of 800° C.

In order to manufacture a glazed product of cement according to this invention, it is possible to use without any limitation all kinds of fritted glaze, crude glaze and volatile glaze. This is one of the salient features of the method according to this invention.

INDUSTRIAL UTILITY

A series of tests were conducted for comparing the mechanical strength of the cement product manufactured by the method of this invention with that of the product manufactured by a conventional method which does not include any burning process. Six samples of the product according to this invention were prepared by pressure dehydration molding from a kneaded mixture of cement obtained by mixing cement and an aggregate at the ratio of 1:2, and kneading them with water, curing in wet air for a week, burning at 800° C. for 10 minutes, and curing in water for four weeks (Group A). Six samples for comparison purposes were likewise molded from a similar mixture of materials, but followed only by curing in water for four weeks (Group B). All the samples measured 30 mm square by 210 mm long. Of each of Groups A and B, sample #1 contained porcelain chamotte having a particle size of 8 mesh or under, and a bulk density of 2.39 as an aggregate; sample #2, porcelain chamotte having a particle size of 8 mesh or under, and a bulk density of 2.36; sample #3, porcelain chamotte having a particle size of 35 mesh or under; sample #4, earthenware chamotte having a particle size of 8 mesh or under; sample #5, 'koka' stone having a particle size of 35 mesh or under; and sample #6, water slag. The samples were tested for bending strength, and the results as shown in Table 2 were obtained. The tests were conducted by using a small material testing machine FSP-500 made by Tokyo Koki K.K., Japan, with a span of 90 mm at a loading rate of 12 mm/min.

As is noted from Table 2, all the samples of the product according to this invention (Group A) showed a higher bending strength than those prepared by the conventional method not including any burning process (Group B), irrespective of the type of the aggregate employed.

TABLE 2

| Sample # | Water-solid ratio | Bending strength (kgf/cm$^2$) | |
|---|---|---|---|
| | | Group A | Group B |
| 1 | 0.10 | 130.5 | 103.4 |
| 2 | 0.10 | 110.2 | 99.6 |
| 3 | 0.133 | 89.8 | 84.6 |
| 4 | 0.10 | 83.7 | 81.3 |
| 5 | 0.133 | 95.0 | 82.2 |
| 6 | 0.133 | 78.9 | 76.1 |

It should, however, be understood that this invention is not merely effective in providing a product having high mechanical strength. The most important advantage of the method according to this invention resides in the smoking treatment of the cement product and the application of a glaze having a high melting point thereto which have been made possible as its mechanical strength is improved by the high-temperature burning process. It is particularly noteworthy that this invention makes it possible to use the fritted glaze which is inexpensive, but has hitherto not been used because of its high melting point, and also an appropriate mixture of fritted glaze with feldspar, clay or other crude material providing, as shown in Tables 3 and 4 by way of example, the glaze which is highly resistant to weathering, wear and chemicals, and which imparts a very satisfactorily colored and lustrous glazed surface to a product of cement. Thus, this invention can create a wide range of new demands for cement products from the construction industry and all other fields of industry associated therewith, and has, therefore, a high degree of industrial utility.

TABLE 3

| M25 frit | 10 parts |
|---|---|
| 1121 frit | 20 parts |
| Glass powder | 65 parts |
| ZnO | 5 parts |

TABLE 4

| 3909 frit | 20 parts |
|---|---|
| Glass powder | 60 parts |
| Feldspar | 10 parts |
| Clay | 5 parts |
| ZrO$_2$ | 5 parts |

We claim:

1. A method of manufacturing a product of cement, which comprises the steps in sequence of:
   adding water into a mixture of cement and an aggregate, and kneading the mixture;
   molding the resulting kneaded mixture into a desired shape;
   preliminarily hardening the resulting molded body by hydration;
   burning the entire body thus preliminarily hardened at a temperature of about 650° to about 950° C. to initially decrease the mechanical strength thereof;
   hardening the burned body by subjecting said body to further hydration by application of water thereto so as to enhance the mechanical strength thereof.

2. A method as set forth in claim 1, wherein said cement mixture also contains a reinforcing material.

3. A method as set forth in claim 1 or 2, wherein said burning is performed by burning a smoking agent in a reducing atmosphere to form a lustrous coating of film on the surface of the molded body, while at the same time burning the molded body, said smoking agent containing a hydrocarbon, whereby said hydrocarbon is thermally decomposed to form fine particles of carbon which are deposited on the surface of said preliminarily hardened body.

4. A method as set forth in claim 1 or 2, wherein a glaze having a high melting point is applied to the preliminarily hardened body prior to the burning step.

5. A method as set forth in claim 4, wherein said glaze is selected from the group consisting of, feldspar, clay, glass powder, zinc oxide, zirconium oxide or mixtures thereof.

6. A method according to claim 2 in which the reinforcing material is selected from the group consisting of glass fibers, ceramic fibers, metal fibers and metal wire.

* * * * *